US006525003B2

(12) United States Patent
Schlemmer et al.

(10) Patent No.: US 6,525,003 B2
(45) Date of Patent: *Feb. 25, 2003

(54) ELECTRICAL WELL LOGGING FLUID AND METHOD OF USING SAME

(76) Inventors: Robert P. Schlemmer, 23854 Hwy. 59 N., #201, Kingwood, TX (US) 77339; Edward Keith Morton, 22315 Wetherburn, Katy, TX (US) 77449

( * ) Notice: Subject to any disclaimer, the term of this patent is extended or adjusted under 35 U.S.C. 154(b) by 27 days.

This patent is subject to a terminal disclaimer.

(21) Appl. No.: 09/057,059

(22) Filed: Apr. 8, 1998

(65) Prior Publication Data

US 2002/0061823 A1 May 23, 2002

Related U.S. Application Data

(60) Provisional application No. 60/058,687, filed on Sep. 12, 1997.

(51) Int. Cl.$^7$ .................................................. C09K 7/06
(52) U.S. Cl. ...................... 507/103; 507/116; 507/134; 507/143; 507/269; 166/254.2
(58) Field of Search .................................. 507/269, 103, 507/143, 116, 134; 166/254.2

(56) References Cited

U.S. PATENT DOCUMENTS

| | | | | |
|---|---|---|---|---|
| 2,542,020 A | | 2/1951 | Fischer ........................ 507/137 |
| 2,552,775 A | | 5/1951 | Fischer et al. .............. 507/119 |
| 2,573,961 A | | 11/1951 | Fischer ........................ 507/137 |
| 2,696,468 A | * | 12/1954 | Fischer ........................ 507/134 |
| 2,712,629 A | * | 7/1955 | Doll ............................. 324/374 |
| 2,739,120 A | * | 3/1956 | Fischer ........................ 507/116 |
| 2,750,557 A | * | 6/1956 | Bricaud ....................... 324/374 |
| 2,930,969 A | * | 3/1960 | Baker .......................... 324/347 |
| 2,943,051 A | * | 6/1960 | Lummus ..................... 507/128 |
| 3,007,865 A | * | 11/1961 | Priest .......................... 507/103 |
| 3,111,491 A | * | 11/1963 | Atkins, Jr. et al. .......... 507/106 |
| 3,521,154 A | * | 7/1970 | Maricelli ................... 340/853.9 |
| 3,775,447 A | * | 11/1973 | Andrews et al. ............ 507/108 |
| 3,899,431 A | | 8/1975 | Hayes et al. ............... 252/8.5 P |
| 4,012,329 A | * | 3/1977 | Hayes et al. ................. 507/140 |
| 4,468,623 A | * | 8/1984 | Gianzero ..................... 324/367 |
| 4,567,759 A | * | 2/1986 | Ekstrom et al. ............. 324/355 |
| 5,096,883 A | * | 3/1992 | Mercer et al. ............... 507/103 |
| 5,189,012 A | | 2/1993 | Patel et al. .................. 507/103 |
| 5,432,152 A | | 7/1995 | Dawson et al. ............. 507/103 |
| 5,439,055 A | | 8/1995 | Card et al. ................... 166/280 |
| 5,472,937 A | * | 12/1995 | Fleming et al. ............. 507/140 |
| 5,909,779 A | * | 6/1999 | Patel et al. .................... 175/50 |
| 6,006,831 A | * | 12/1999 | Schlemmer et al. ... 166/250.01 |
| 6,029,755 A | * | 2/2000 | Patel ............................ 175/50 |

OTHER PUBLICATIONS

Oilfield Glossary. Schlumberger. Retrieved from the internet <URL: http://glossary.connect.slb.com> Terms: Electrical Stability Test, Electrical Resitivity, Invert Emulsion.*

* cited by examiner

*Primary Examiner*—Jill Warden
*Assistant Examiner*—LaToya Cross
(74) *Attorney, Agent, or Firm*—Howrey Simon Arnold & White LLP

(57) ABSTRACT

A well logging fluid is provided having a relatively non-conductive fluid and an effective amount of a salt sufficient to modify the electrical characteristics the relatively non-conductive fluid resulting in a modified fluid or well logging fluid such that an electrical well-logging tool when disposed in the modified fluid can perform an electrical well-logging survey of a borehole containing the modified fluid. The non-conductive fluid is selected from the group consisting of a non-aqueous fluid and an invert emulsion of an aqueous phase in a non-conductive liquid. In an invert emulsion, the aqueous portion thereof ranges up to about 70 percent by volume. The salt has a cation and an anion, wherein the cation is selected from the group consisting of divalent and trivalent metal cations capable of forming a complex, and the anion is one that disassociates from the cation in an aqueous medium. Preferably, the modified fluid or well logging fluid has an electrical stability of at most 350 volts, more preferably at most 250 volts, as measured according to API RB 13-2. The well logging may be used for electric well logging and imaging.

15 Claims, No Drawings

ELECTRICAL WELL LOGGING FLUID AND METHOD OF USING SAME

This application claims the benefit of Provisional application Ser. No. 60/058,687, filed Sep. 12, 1997.

FIELD OF THE INVENTION

This invention generally relates to explorations for hydrocarbons involving electrical investigations of a borehole penetrating an earth formation. More specifically, this invention relates to performing such borehole investigations employing a logging fluid which is an invert emulsion or a non-aqueous fluid, wherein the logging fluid has an electrical stability of at most 350 volts as measure by API RP 13B-2. In one aspect of the present invention, this invention relates to performing such borehole investigations employing a logging fluid comprising a non-conductive fluid which has been modified by the addition of an additive, wherein the additive is a salt having a cation, preferably a divalent or trivalent cation, which is capable of forming a complex, in an effective amount to sufficiently modify the electrical characteristics thereof resulting in a modified fluid which when disposed in at least a portion of the borehole can be used with a conventional electrical well logging tool to perform such investigations as the tool is moved along such portion of the borehole.

BACKGROUND OF THE INVENTION

During or after the drilling of oil or gas wells, measurements of the electrical characteristics of the wellbore are performed. Electrical earth borehole logging is well known and various devices and techniques have been described. A variety of measurements may be made, but typically include resistive measurements extending deep into the formation and also superficial measurements of changes in resistivity at the surface of the borehole. In an electrical investigation of a borehole, current from an electrode is introduced in the formation from a tool inside the borehole. If this current is maintained constant, the voltage measured at a monitor electrode is proportional to the resistivity of the earth formation being investigated. If the current is varied to maintain constant the voltage measured at a monitor electrode, the current is inversely proportional to the resistivity of the earth formation being investigated. If both voltage and current are allowed to vary, their ratio is proportional to the resistivity of the earth formation being investigated. Substantial advances have been made in such electrical investigations by using electrodes whose currents are focused by other electrodes and thus determine the resistivity of the formation at a desired distance from the borehole wall surface. Examples of such techniques and devices for focused electrical investigation are described and shown in the U.S. Pat. Nos. 2,712,629 to Doll; 2,750,557 to Bricuad; 3,521,154 to Maricelli; and 4,468,623 to Gianzero et al.

In U.S. Pat. No. 2,712,629 to Doll, pad mounted sets of electrodes are described as each formed of a central survey electrode surrounded at spaced intervals by continuous guard electrodes embedded in segmented recesses.

In U.S. Pat. No. 2,750,557 to Bricuad, the pad mounted electrodes are formed of electrically directly connected segments or buttons.

In U.S. Pat. No. 3,521,154 to Maricelli, a plurality of survey electrodes are mounted on a single pad as a composite focusing electrode, with a pair of the survey electrodes aligned along the direction of travel of the tool along the borehole and one survey electrode horizontally displaced to provide a technique for effectively improving the signal to noise ratio of the resistivity measurements.

In U.S. Pat. No. 4,468,623 to Gianzero et al., an earth formation investigating tool is described in which borehole wall features on the order of millimeters in size can be detected. The tool includes an array of small cross-section survey electrodes (buttons) which are pressed towards the borehole wall and each button injects an electric current into the adjoining formation. The individual button currents are monitored and signals representative of button currents are recorded as curves as a function of depth. The measured button currents reflect the resistivity of the material in front of each button. In order to achieve a high resolution investigation, the electrodes are arranged in an array of multiple rows. The electrodes are so placed at intervals along a circumferential direction about the borehole axis as to inject survey currents into borehole wall segments which overlap with each other to a predetermined extent as the tool is moved along the borehole wall. In this manner, a detail high resolution resistivity or conductivity investigation of the borehole wall can be made. The presence of a fracture may be identified by noting a deviation between the survey currents from different pads. Such survey current deviation may indicate a fracture by virtue, for example, of the invasion of higher conducting mud into the fracture.

As inferred from the foregoing reference to "higher conducting mud", such logging tools primarily were designed for use in an electrically conductive aqueous-based fluid. Accordingly, it has been possible to obtain electric logs from well boreholes primarily by suspending the logging tool in an electrically conductive aqueous media. As oil wells were and continue to be drilled deeper into water sensitive formations, the application of non-aqueous-based drilling fluids or invert emulsions of water or brine in the various types of fluids used in such non-aqueous-based drilling fluids, such as organic solvents, diesel fuel, mineral oil, vegetable oil and synthetic fluids, is increasing. Because the continuous phase of this invert emulsion is usually a non-conductor of electricity, conventional electric logs which require passage of electrons through a conductive media have not been effective in these types of drilling and completion fluids.

Some logging tools have been designed for use in oil-based drilling fluids. For example, in such tools, knife-edge electrodes have been used to ensure contact with the filter-cake or mudcake which usually forms on the side of the borehole. However, U.S. Pat. No. 3,521,154 to Maricelli notes that since the oil-based drilling fluid or mud is relatively non-conductive, even the slightest separation between the knife-edge and the mudcake will provide erroneous indications of the conductivity of the adjoining formation. In U.S. Pat. No. 2,930,969 to Baker, the tool thereof may employ brush-like contacts which scratch through the mudcake and effect good electrical connection with the rock when an oil-based fluid is used.

A few attempts to make oil-based drilling fluids electrically conductive for the purpose of electrical logging have been reported though none of them has been a commercial success. U.S. Pat. No. 2,696,468 to Fischer disclosed a conductive oil-based drilling fluid containing up to 10 percent by weight water, an electrolyte and certain types of emulsifying agents, specifically sulfated and sulfonated organic compounds which promote the formation of oil-in-water emulsions. The electrolytes were water-soluble ionizable metallic compounds and were for the most part water-soluble salts of alkali- and alkaline-earth metals and alkali-metal hydroxides. Though almost forty compounds, including magnesium chloride, magnesium nitrate and magnesium sulfate, were specifically named as electrolytes, only seven sodium-containing compounds and calcium chloride were exemplified. Fischer disclosed a particular preference to alkali-metal hydroxides, silicates and phosphates. U.S. Pat. No. 2,739,120 also to Fischer discloses similar oil-based fluids which are asserted to be electrically conductive and contains a non-ionic surfactant rather than the emulsifiers of U.S. Pat. No. 2,696,468. Though almost forty compounds, including magnesium chloride, magnesium nitrate and magnesium sulfate, are specifically named as electrolytes, only sodium-containing compounds were exemplified. Both of these patents disclosed that in order to maintain the general desirable characteristics of oil-based drilling fluids, the water content should be maintained below 10 percent by weight, i.e., avoiding the formation of a water-in-oil or invert emulsion.

About twenty-five years later, Hayes et al. in U.S. Pat. No. 4,012,329 disclosed water-in-oil microemulsion drilling fluids which were asserted as being capable of conducting electrical current and as such permitted the use of ordinary electrical logging techniques. This fluid contained water, sodium petroleum sulfonate, hydrocarbon, bentonite and, optionally, cosurfactant, electrolyte, gelling agents and fluid loss agents. The electrolyte was a water-soluble inorganic base, inorganic acid or, preferably, inorganic salt. Certain sodium and potassium salts were identified, but not specifically identified in the examples.

Therefore, a need exists to modify non-conducting fluids in order to effectively use the great variety of conventional electrical well logging tools, particularly imaging tools.

SUMMARY OF THE INVENTION

Accordingly, a well logging fluid comprising:
a relatively non-conductive fluid, wherein the non-conductive fluid is selected from the group consisting of a non-aqueous fluid and an invert emulsion of an aqueous phase in a non-conductive liquid, wherein the aqueous portion of the invert emulsion ranges up to about 70 percent by volume, preferably from about 10 to about 40 percent by volume; and
an effective amount of a salt sufficient to modify the electrical characteristics the relatively non-conductive fluid resulting in a modified fluid or well logging fluid such that an electrical well-logging tool when disposed in the modified fluid can perform an electrical well-logging survey of a borehole containing the modified fluid,
wherein the salt has a cation and an anion, the cation is selected from the group consisting of divalent and trivalent metal cations capable of forming a complex, and the anion is one that disassociates from the cation in an aqueous medium. Preferably, the modified fluid or well logging fluid has an electrical stability of at most 350 volts, more preferably at most 250 volts, as measured according to API RB 13-2. The metals for the cation include magnesium, zinc, cobalt, copper, aluminum and iron, preferably magnesium, zinc and aluminum. The anion includes halides, nitrates, formates, citrates and acetates, preferably halides and nitrates.

There is also provided a method for measuring a characteristic of earth formations traversed by a borehole, the method comprising the steps of:
providing a relatively non-conductive fluid, wherein the non-conductive fluid is selected from the group consisting of a non-aqueous fluid and an invert emulsion of an aqueous phase in a non-conductive liquid, wherein the aqueous portion of the invert emulsion ranges up to about 70 percent by volume, preferably from about 10 to about 40 percent by volume;
adding an effective amount of a salt to the non-conductive fluid sufficient to modify the electrical characteristics thereof resulting in a modified fluid such that an electrical well-logging tool when disposed in the modified fluid can perform an electrical well-logging survey of a borehole containing the modified fluid,
wherein the salt has a cation and an anion, the cation is selected from the group consisting of divalent and trivalent metal cations capable of forming a complex, and the anion is one that disassociates from the cation in an aqueous medium;
providing a column of the modified fluid in a portion of the borehole;
disposing an electrical well-logging survey tool in the portion of the borehole; and
performing an electrical well-logging survey of the portion of the borehole using the electrical well-logging tool.

There is further provided a method for generating a log of fine features of a borehole wall with an electrical well-logging survey tool that is suspended from a cable inside the borehole which penetrates an earth formation, the method comprising the steps of:
providing a relatively non-conductive fluid, wherein the non-conductive fluid is selected from the group consisting of a non-aqueous fluid and an invert emulsion of an aqueous phase in a non-conductive liquid, wherein the aqueous portion of the invert emulsion ranges up to about 70 percent by volume, preferably from about 10 to about 40 percent by volume;
adding an effective amount of a salt to the non-conductive fluid sufficient to modify the electrical characteristics thereof resulting in a modified fluid such that an electrical well-logging tool when disposed in the modified fluid can perform an electrical well-logging survey of a borehole containing the modified fluid,
wherein the salt has a cation and an anion, the cation is selected from the group consisting of divalent and trivalent metal cations capable of forming a complex, and the anion is one that disassociates from the cation in an aqueous medium;
providing a column of the modified fluid in a portion of the borehole;
disposing an electrical well-logging survey tool in the portion of the borehole; and
performing an electrical well-logging survey of the portion of the borehole using the electrical well-logging tool, wherein the survey includes at least
generating signals which represent a high spatial resolution measurement of a characteristic of the borehole and in the aggregate represent comparable high resolution features of the characteristic over an effectively continuous vertical and circumferential segment of the borehole wall and
generating high resolution depth signals representative of the of the borehole depth to which the high spatial resolution characteristic signals relate;
converting the characteristic signals with the depth signals to produce the characteristic signals as a function of borehole depth;

deriving from the latter signals, signals which represent the characteristic as a linear function of borehole depth;

generating color, e.g., grey, scale values of the latter signals for display of fine features of the characteristic; and forming from the color scale values a visual image of the effectively continuous segment of the borehole as a linear function of borehole depth wherein the image has a color scale with which fine features of the characteristic of the segment of the borehole wall are visually enhanced.

There is also provided a method for generating a log of fine conductivity features of a borehole wall with a tool that is suspended from a cable inside a borehole which penetrates unearth formation and which tool has a plurality of survey electrodes arranged in multiple rows, preferably two rows, in a predetermined overlapping manner to investigate a circumferentially overlapping continuous segment of the borehole wall with high spatial resolution, the method comprising the steps of:

providing a relatively non-conductive fluid, wherein the non-conductive fluid is selected from the group consisting of a non-aqueous fluid and an invert emulsion of an aqueous phase in a non-conductive liquid, wherein the aqueous portion of the invert emulsion ranges up to about 70 percent by volume, preferably from about 10 to about 40 percent by volume;

adding an effective amount of a salt to the non-conductive fluid sufficient to modify the electrical characteristics thereof resulting in a modified fluid such that an electrical well-logging tool when disposed in the modified fluid can perform an electrical well-logging survey of a borehole containing the modified fluid, wherein the salt has a cation and an anion, the cation is selected from the group consisting of divalent and trivalent metal cations capable of forming a complex, and the anion is one that disassociates from the cation in an aqueous medium;

providing a column of the modified fluid in a portion of the borehole;

disposing an electrical well-logging survey tool in the portion of the borehole; and performing an electrical well-logging survey of the portion of the borehole using the electrical well-logging tool, wherein the survey includes at least generating high spatial resolution conductivity signals whose amplitudes represent the conductivity of the borehole wall opposite the survey electrodes with the conductivity signals in the aggregate representing conductivity of an effectively continuous vertical and circumferential segment of the borehole wall;

converting the conductivity signals to high spatial resolution conductivity signals which represent the conductivity of the borehole wall segment as a linear function of borehole depth; and forming from the latter conductivity signals a visual image of the effectively continuous borehole segment as a linear function of borehole depth and with a color, e.g., grey, scale with which fine conductivity features indicative of stratigraphy, vugs and fractures present in the borehole wall segments are visually enhanced.

DETAILED DESCRIPTION OF THE INVENTION

Electrical stabilities of invert emulsion muds can range in practice from 50 volts to over 2000 volts depending upon dielectric concentration, emulsification package and concentration, and contaminants of an invert emulsion drilling fluid system. Normally, stabilities above 500 volts are specified to reduce the chance of disruption of the invert emulsion. While the oil-based fluids and invert emulsions used for drilling of oil wells are non-conducting or dielectric substances, application across the emulsion of an electrical potential of sufficient voltage will cause rearrangement and reshaping of emulsified brine droplets. If the applied potential is sufficient, dielectric breakdown of the invert emulsion will occur and electrons can flow through the emulsion as demonstrated by measurable current flow. Drilling fluid electrical stability of about 350 volts or less, preferably about 250 volts or less, allows use of an electric logging tool.

In the present invention, certain additives are added to the relatively non-conductive invert emulsion to lower the voltage required to facilitate dielectric breakdown of the emulsion. Specific formulations, techniques and concentrations of those additives are required to permit passage of electrons though the emulsion without destructive destabilization of the emulsion itself.

Pursuant to the present invention, a well logging fluid comprising:

a relatively non-conductive fluid, wherein the non-conductive fluid is selected from the group consisting of a non-aqueous fluid and an invert emulsion of an aqueous phase in a non-conductive liquid, wherein the aqueous portion of the invert emulsion ranges up to about 70 percent by volume, preferably from about 10 to about 40 percent by volume; and an effective amount of a salt sufficient to modify the electrical characteristics the relatively non-conductive fluid resulting in a modified fluid or well logging fluid such that an electrical well-logging tool when disposed in the modified fluid can perform an electrical well-logging survey of a borehole containing the modified fluid, wherein the salt has a cation and an anion, the cation is selected from the group consisting of divalent and trivalent metal cations capable of forming a complex, and the anion is one that disassociates from the cation in an aqueous medium. Preferably, the modified fluid or well logging fluid has an electrical stability of at most 350 volts, more preferably at most 250 volts, as measured according to API RB 13-2. The metals for the cation include magnesium, zinc, cobalt, copper, aluminum and iron, preferably magnesium, zinc and aluminum. The anion includes halides, nitrates, formates, citrates and acetates, preferably halides and nitrates.

There is also provided a method for measuring a characteristic of earth formations traversed by a borehole, the method comprising the steps of:

providing a relatively non-conductive fluid, wherein the non-conductive fluid is selected from the group consisting of a non-aqueous fluid and an invert emulsion of an aqueous phase in a non-conductive liquid, wherein the aqueous portion of the invert emulsion ranges up to about 70 percent by volume, preferably from about 10 to about 40 percent by volume;

adding an effective amount of a salt to the non-conductive fluid sufficient to modify the electrical characteristics thereof resulting in a modified fluid such that an electrical well-logging tool when disposed in the modified fluid can perform an electrical well-logging survey of a borehole containing the modified fluid, wherein the salt has a cation and an anion, the cation is selected from the group consisting of divalent and trivalent metal cations capable of forming a complex, and the anion is one that disassociates from the cation in an aqueous medium;

providing a column of the modified fluid in a portion of the borehole;

disposing an electrical well-logging survey tool in the portion of the borehole; and performing an electrical well-logging survey of the portion of the borehole using the electrical well-logging tool.

There is further provided a method for generating a log of fine features of a borehole wall with an electrical well-logging survey tool that is suspended from a cable inside the borehole which penetrates an earth formation, the method comprising the steps of:

providing a relatively non-conductive fluid, wherein the non-conductive fluid is selected from the group consisting of a non-aqueous fluid and an invert emulsion of an aqueous phase in a non-conductive liquid, wherein the aqueous portion of the invert emulsion ranges up to about 70 percent by volume, preferably from about 10 to about 40 percent by volume;

adding an effective amount of a salt to the non-conductive fluid sufficient to modify the electrical characteristics thereof resulting in a modified fluid such that an electrical well-logging tool when disposed in the modified fluid can perform an electrical well-logging survey of a borehole containing the modified fluid, wherein the salt has a cation and an anion, the cation is selected from the group consisting of divalent and trivalent metal cations capable of forming a complex, and the anion is one that disassociates from the cation in an aqueous medium;

providing a column of the modified fluid in a portion of the borehole;

disposing an electrical well-logging survey tool in the portion of the borehole; and performing an electrical well-logging survey of the portion of the borehole using the electrical well-logging tool, wherein the survey includes at least generating signals which represent a high spatial resolution measurement of a characteristic of the borehole and in the aggregate represent comparable high resolution features of the characteristic over an effectively continuous vertical and circumferential segment of the borehole wall and generating high resolution depth signals representative of the of the borehole depth to which the high spatial resolution characteristic signals relate;

converting the characteristic signals with the depth signals to produce the characteristic signals as a function of borehole depth;

deriving from the latter signals, signals which represent the characteristic as a linear function of borehole depth;

generating color, e.g., grey, scale values of the latter signals for display of fine features of the characteristic; and forming from the color scale values a visual image of the effectively continuous segment of the borehole as a linear function of borehole depth wherein the image has a color scale with which fine features of the characteristic of the segment of the borehole wall are visually enhanced.

There is also provided a method for generating a log of fine conductivity features of a borehole wall with a tool that is suspended from a cable inside a borehole which penetrates unearth formation and which tool has a plurality of survey electrodes arranged in multiple rows, preferably two rows, in a predetermined overlapping manner to investigate a circumferentially overlapping continuous segment of the borehole wall with high spatial resolution, the method comprising the steps of:

providing a relatively non-conductive fluid, wherein the non-conductive fluid is selected from the group consisting of a non-aqueous fluid and an invert emulsion of an aqueous phase in a non-conductive liquid, wherein the aqueous portion of the invert emulsion ranges up to about 70 percent by volume, preferably from about 10 to about 40 percent by volume;

adding an effective amount of a salt to the non-conductive fluid sufficient to modify the electrical characteristics thereof resulting in a modified fluid such that an electrical well-logging tool when disposed in the modified fluid can perform an electrical well-logging survey of a borehole containing the modified fluid, wherein the salt has a cation and an anion, the cation is selected from the group consisting of divalent and trivalent metal cations capable of forming a complex, and the anion is one that disassociates from the cation in an aqueous medium;

providing a column of the modified fluid in a portion of the borehole;

disposing an electrical well-logging survey tool in the portion of the borehole; and performing an electrical well-logging survey of the portion of the borehole using the electrical well-logging tool, wherein the survey includes at least generating high spatial resolution conductivity signals whose amplitudes represent the conductivity of the borehole wall opposite the survey electrodes with the conductivity signals in the aggregate representing conductivity of an effectively continuous vertical and circumferential segment of the borehole wall;

converting the conductivity signals to high spatial resolution conductivity signals which represent the conductivity of the borehole wall segment as a linear function of borehole depth; and forming from the latter conductivity signals a visual image of the effectively continuous borehole segment as a linear function of borehole depth and with a color, e.g., grey, scale with which fine conductivity features indicative of stratigraphy, vugs and fractures present in the borehole wall segments are visually enhanced.

In one embodiment of the present invention, the non-conductive fluid is an invert emulsion drilling fluid which contains from about 5 to about 70 volume percent water and from about 95 to about 30 volume percent of a non-conductive fluid, preferably from about 10 to about 40 volume percent water and from about 90 to about 60 volume percent of a non-conductive liquid, where such volume percent is based on the total volume of the water and the non-conductive liquid (also referred to herein as a non-aqueous fluid).

In another embodiment of the preset invention, the non-conductive fluid contains less than 5 percent by volume water and greater than 95 percent by volume, up to 100 percent by volume, of a non-conductive liquid, where such volume percent is based on the total volume of the water and the non-conductive liquid. Accordingly, the non-conductive fluid may initially contain no water or aqueous portion. The volume of water may increase over time as a result of formation water being present in the borehole or the adjacent formation which is incorporated into the non-conductive fluid.

Non-Conductive Liquids

The non-conductive liquid includes, but is not limited to, crude oil, hydrocarbon refined fractions from crude oils such as diesel fuel, a gasoline cut off of a crude column and aliphatic and aromatic mineral oils, including hydrogenated mineral oils; synthetic hydrocarbons such as n-paraffins, alpha-olefins, internal olefins and poly-alphaolefins; synthetic liquids such as ethers, e.g., dialkyl ethers, esters, e.g., alkyl alkanoate esters, and acetals; and natural oils such as triglycerides including rapeseed oil, sunflower oil and mixtures thereof. Other suitable non-conductive liquids include benzenes, glycols, fatty acids, alcohols, silicone/siloxane based oils and other similar materials.

Synthetic hydrocarbons suitable as non-conductive fluids herein are disclosed in U.S. Pat. Nos. 5,432,152; 5,589,442; and 5,096,883, which are hereby incorporated by reference. U.S. Pat. No. 5,432,152 discloses base oils comprising one or more linear alpha-olefins having from about 14 to 30 carbon atoms and, preferably, from about 14 to 20 carbon atoms. The preferred linear alpha-olefins and mixtures thereof, such as $C_{14}$, $C_{14-16}$, $C_{14-24}$, and $C_{16-18}$ are commercially available from Ethyl Corporation. Such alpha-olefin products are derived from Ziegler chain growth and may contain up to about 40 wt. percent, based on the total olefin content, of vinylidene and/or linear internal olefins.

U.S. Pat. No. 5,589,442 discloses a mixture of "mostly linear" olefins, which is a mixture of olefin in which the majority of olefins are linear olefins, i.e., non-branched olefins. Such mixtures may even, but not necessarily, consist wholly of linear olefins. Such linear or normal olefins are straight chain, non-branched hydrocarbons with at least one double carbon bond present in the chain. According to U.S. Pat. No. 5,589,442, preferred mixtures are those comprising mostly linear olefins with 12 or more carbons. Preferably, the linear olefin contains between 12 and 24 carbon atoms, more preferably between 14 and 18 carbon atoms. Both odd and even number olefins can be used. One useful composition is prepared by double-bond isomerization of one or more normal alpha olefins having between 14 and 18 carbon atoms. In such mixtures, the majority of olefins are linear i.e., the mixtures are "mostly linear" or predominately linear. The term mostly linear as used herein means that between 50% and 100%, preferably between 60% and 100%, and more preferably between 70% and 80% of the olefins in the mixture do not have branch points along the hydrocarbon chain. On the other hand, it is further preferred that such mixtures also contain olefins with some side-chain branching. It is preferred that the branched olefins comprise at least 5%, preferably at least 10% of the mixture. Such mixtures are typically substantially free of aromatics. Although discussed herein in terms of olefinic products, such product hydrocarbons can be hydrogenated to achieve complete or preferably partial saturation of the olefinic unsaturation originally present therein.

U.S. Pat. No. 5,096,883 discloses the use of non-toxic oils as suitable base-oils for use in the drilling fluid of the present invention and are sometimes termed "synthetic oils." This term is usually applied to polymeric substances produced from chemical monomeric materials. In general, synthetic oils do not contain aromatics and are much less toxic than most "natural" crude oils. These types of base-oils are comprised of branched-chain paraffins and/or branched-chain paraffins substituted with an ester moiety, such paraffins preferably containing between about 16 and about 40 carbon atoms per molecule and, more preferably, between about 16 and about 32 carbon atoms per molecule. (As used herein, a branched-chain paraffin is a saturated, branched-chain hydrocarbon, that is, an alkane. A branched-chain paraffin substituted with an ester moiety, or functionality, is of the formula $R^1COOR^2$, where $R^1$ and $R^2$ are both unsubstituted alkyl groups, at least one of which is a branched-chain.) According to U.S. Pat. No. 5,096,883, preferred oils for the oil-bases of drilling fluids are branched-chain, saturated hydrocarbons (branched-chain paraffin)—frequently referred to in the lubrication arts as "polyalphaolefins" or "PAO's", and sometimes, generically (and chemically inaccurately), as "isoparaffins". A preferred branched-chain paraffin for formulating the non-conductive fluid-base logging fluids, according to the present invention, is the dimer of 1-decene (decylene), which has 20 carbon atoms per molecule, sometimes referred to commercially and/or sold as "1-decene dimer". Such an branched-chain paraffin is produced by oligomerizing 1-decene (usually itself synthesized by the polymerization of ethylene) and then hydrogenating the resulting material to yield a product having an empirical formula of $C_{20}H_{42}$.

Commercially available synthetic hydrocarbons include:
(1) alpha olefins available as:
   C1624 Olefin (CAS 122491-53-6) from Amoco Chemicals, Chicago, Ill.,
   C1618 Olefin (CAS 68855-60-7) from Albemarle Corp., Baton Rouge, La.,
   NEODENE 16/18 linear alpha olefin from Shell Oil Co., Houston, Tex.,
   NEODENE 1518 internal olefin blend (CAS 93762-80-2) from Shell Oil Co.,
   BIO-BASE Series 300 LDF olefin/paraffin mixture (primarily a C10–C15 olefins/C10–C15 paraffins mixture) from Shrieve Chemical Co., The Woodlands, Tex.,
   Alpha Olefin C1416 (CAS 68855-59-4) from Albemarle Corp., and
   C16/C18 Alpha Olefins, Isomerized (mixture of isomerized hexadecene and octadecene) from Chevron Chemicals;
(2) polyalpha olefins available as:
   DURASYN 162 Polyalphaolefin (CAS 68649-11-6) from Amoco Chemicals,
   OMC 42 Polyolefin from Baroid Drilling Fluids, Inc., Houston, Tex.,
   PAO Dimer C10 (CAS 17438890, a C10 alpha olefin dimer) from Chevron Chemical Co., San Ramon, Calif., and
   BIO-BASE PAO 2 (a C10 alpha olefin dimer which has been hydrogenated and distilled) from Shrieve Chemical Products; and
(3) alkanes available as:
   SARALINE 185 aliphatic hydrocarbon (CAS 172343-37-2), a mixture of C12 to C26 alkanes, both linear and branched, from Shell MDS Malaysia Sdn. Bhd.

A suitable hydrocarbon refined fraction is commercially available as ESCAID 110 low-toxicity drilling mud oil (CAS 64742-47-8), a hydrotreated light (petroleum) distillate from Exxon Co., U.S.A. A suitable derivatized natural oil is commercially available as PETROFREE (an ester derivative of vegetable oil) from Baroid.

Salt Additive

When the salt is added to non-conductive fluid-based logging fluids and the invert emulsion logging fluids according to the present invention, the salt reduces the dielectric constant of the fluid sufficiently to allow application of electric logging devises normally used only in conductive media. Estimation of performance of the material is made using industry standard Electrical Stability Test.

The conductive salt or salts which are rendered conductive upon addition to a drilling fluid, brine, or water will, depending upon particle or droplet shape, for and/or specific chemical incompatibilities, reduce the dielectric properties of an oil-based drilling fluid or invert emulsion drilling fluid.

The soluble salts, hygroscopic salts or salt hydrates, are selected from salts having cations which are capable of forming complexes, preferably divalent and trivalent cations such as salts of magnesium, zinc, cobalt and copper as divalent cationic salts and salts of aluminum and iron as trivalent cationic salts. These metals are capable of forming complexes. Such salts are referred to herein as primary salt additives. In this regard, note that salts of sodium (a monovalent cationic salt), calcium (divalent cationic salt) and tin (tetravalent cationic salt) are not suitable in the present invention as primary salt additives. Such salts may be used in combination with the primary salt additives as secondary salt additives. These primary and secondary salts additives may be screened out of the fluid once the logging has been completed, permitting reuse of the drilling mud.

The primary salt additives include salts of magnesium, zinc, cobalt, copper, iron and aluminum, for example, halides, nitrates, formates, citrates, and acetates. Sulfates are not preferred as evidenced by their lack of ability to suitably reduce the electrical stability of the logging fluid in Example 2 using magnesium sulfate. The primary salt additives are added to an invert emulsion mud to both bridge the dielectric phase, increase conductivity of any internal water phase, or to weaken the emulsion stability of the system by reacting with the emulsifying surfactant. The dielectric stability of the emulsion will be reduced by any of these mechanisms.

The secondary salt additives include salts of metals which do not form complexes. Such secondary salt additives include monovalent cationic salts, for example, salts of sodium or potassium, such as sodium or potassium halides, nitrates, formates, citrates, or acetates; divalent cationic salts, for example, salts of calcium such as calcium halides, nitrates, formates, citrates, or acetates; and tetravalent cationic salts, for example, salts of tin such as tin halides, nitrates, formates, citrates, or acetates.

Dielectric properties are characterized by breakdown voltage. Non-aqueous drilling fluids may be viewed as partial dielectric materials. An industry standard device (used in API RP 13 B-2) measures the breakdown voltage at which a current of about 60 microamps passes across a specific electrode gap. A more sensitive device able to detect current flow of 10 microamps would indicate a lower breakdown voltage. A less sensitive device able to detect current flow of 100 microamps would indicate a higher breakdown voltage. Accordingly, the breakdown voltage of a substance is a function of the lowest current flow detectable by a certain measuring device. Therefore, for a particular substance, the breakdown voltage as measured by a certain measuring device may be correlated to the breakdown voltage measured by a different device having a lower or higher lowest current detection limit. Further, with these considerations in mind, the electrical logging tool may be purposefully selected to limit the amount of current and/or voltage required to obtain suitable results in the specific fluid to be used as part of an optimization of the method of the present invention. The electrical logging tool used to evaluate this invention applied voltages of up to 1000 volts and responded and recorded current changes of less than 25 microamps. This tool was according to U.S. Pat. No. 4,468,623 to Gianzero, more specifically an embodiment similar to that shown in FIGS. 2 and 5 thereof. U.S. Pat. No. 4,468,623 to Gianzero is hereby incorporated by reference.

Logging Fluid

The logging fluid comprises a non-conductive liquid as the continuous phase. The non-conductive fluid may comprise up to 100% by volume of the logging fluid composition. In one embodiment, water, usually in the form of brine, is added as part of the composition to form an invert emulsion and the aqueous phase may comprise up to 70% by volume of the composition. In a preferred embodiments water is added from 5% to 60% by volume and in the most preferred embodiment water is added from 10% to 40% by volume. The aqueous phase may be either fresh water or aqueous solutions called brines containing salts such as sodium chloride, potassium chloride, calcium chloride, and combination thereof in varying amounts ranging up to 40% by weight. These salts are secondary salt additives and, as in conventional drilling fluids, function as a densifier and emulsion stabilizer, and also serve to protect salt formations from dissolution in the logging fluid.

Conventional Additives

In the same manner as drilling fluids, the logging fluids according to the present invention may also contain one or more conventional additives such as emulsifiers, viscosifiers, densifiers, weighting agents, oil wetting agents, alkalinity control agents, filtration control agents and fluid loss preventing agents to enable the fluids to meet the needs of particular drilling or logging operations. The additives function to keep cutting the debris in suspension, provide the required viscosity, density and additive wetting properties to the fluid, and prevent the loss of liquids from the fluid due to the migration of the liquids into the formations surrounding the wellbore.

Emulsifiers

The compositions of one embodiment of this invention require emulsifiers to incorporate the brine or water phase into the non-aqueous continuous phase. Specifically, in the water-in-non-conductive fluid emulsion or invert emulsion of the present invention, the emulsion is formed by vigorously mixing the water or brine and non-conductive liquid together with one or more emulsifying agents. In the absence of mechanical agitation, such emulsions are generally unstable so, as in drilling fluids, anionic surfactants are commonly added. Hydrocarbon soluble anionic surfactants are preferred for stabilizing invert emulsions. The invert emulsion can be further stabilized by adding macromolecular surfactants. These include the polyamide class of emulsifiers manufactured by the reaction of polyamines with the combination of fatty acids and basic acids such as maleic and fumaric acids.

Various emulsifiers are chemical compounds which have both oleophilic and hydrophilic parts. Such emulsifiers are known by those skilled in the art and include, but are not limited to, fatty acids, soaps of fatty acids (e.g., calcium soaps), and fatty acid derivatives including amido-amines, polyamides, polyamines, sulfonates, triglycerides, esters (such as sorbitan monoleate polyethoxylate, sorbitan dioleate polyethoxylate), imidazolines, alcohols and combination derivatives of the above. Useful examples of hydrocarbon soluble surfactants are the di- and trivalent metal salts of fatty acids. The fatty acid soaps can be formed in situ by the addition of the desired fatty acid and a base, preferably lime. Blends of these materials as well as other emulsifiers can be used for the application. Versacoat® and Versacoat® N.S. are emulsifiers manufactured and distributed by M-I Drilling Fluids Company. EZ MUL NTE is an emulsifier and oil wetting agent available from Baroid Drilling Fluids, Inc. ULTIDRILL EMUL HT Emulsifier C382 is an emulsifier available from Dowell Schlumberger. The emulsifiers are generally used in amounts of form about 1 to 8 kilograms per cubic meter of logging fluid.

Viscosifier

The viscosity and particulate suspending ability of the logging fluid are established by a number of the components of the logging fluid, and can be increased by the addition of such materials as clays and polymers. The clay will also impart some desirable filtration control properties. The more commonly used clays are bentonite (sodium form of montmorillonite) and attapulgite. However, any other clay types and mixtures of clay are also useful in the present logging fluid. Typically, to improve their wettability by the non-conductive liquid base of the logging fluid, the clays are reacted with organic compounds which have cationic functional groups, for example, quaternary ammonium salts which contain alkyl groups of at least about 12 carbon atoms per molecule. Polymeric substances useful for increasing the viscosity of the present logging fluid include polyacrylates, cellulose derivatives, starches, gums, and polymers produced by bacteria such as *Xanthomas campestris*. Other viscosifiers, such as oil soluble polymers, polyamide resins, polycarboxylic acids and soaps can also be used. The amount of viscosifier used in the composition can very depending upon the conditions and type of formation(s) encountered in the wellbore. However, the viscosifiers can be used in amounts of from about 0.5 to 5 kilograms per cubic meter of logging fluid. VG-69 is an organoclay material distributed by M-I Drilling Fluids Company. GELTONE II and BENTONE 38 are organophilic clays available from Baroid Drilling Fluids, Inc. TRUVIS HT VISCOSIFIER C226 is a viscosifier available from Dowell Schlumberger, Sugar Land, Tex.

Weighting Agent

The logging fluid composition of this invention may optionally contain a weighting agent. The quantity depends upon the desired density of the final composition. It is often desirable to increase the drilling fluid density to prevent collapse of the formation into the borehole. The preferred weighting agents include, but are not limited to, barite, iron oxide, calcium carbonate, galena, siderite and the like. The weighting agent is typically added to result in a logging fluid density of up to 24 pounds per gallon, preferably up to 21 pound per gallon and most preferably up to 19.5 pounds per gallon.

Wetting Agents

To assist in maintaining these solid weighting agents in suspension in the logging fluid, it is often desirable to add a wetting agent. Various wetting agents are available. The emulsion stabilizing surfactants described above will serve this function also; however, other wetting agents can be added, if desired. The wetting agents useful in the present invention include, but not limited to, are fatty acids, crude tall oil, oxidized crude tall oil, organic phosphate esters, modified imidazolines and amido-amines, alkyl aromatic sulfates and sulfonates and the like and combinations or derivatives of the above. Other suitable wetting agents include lecithin and various known surface active agents, such as polyethexylated alkylphenols, polyethoxylated alcohols, or polyethoxylated polyol fatty acid esters. Organic esters of polyhydric alcohols suitable as such surface active agents are described in U.S. Pat. No. 2,943,051 (to Lummis; hereby incorporated by reference). Versawet® and Versawet® NS are wetting agents manufactured and distributed by M-I Drilling Fluids Company. ULTIDRILL OW Oil Wetting Agent C384N is available from Dowell Schlumberger. The wetting agents can be added in amounts of up to about 4 kilograms per cubic meter of logging fluid.

Fluid Loss Control

To prevent the migration of liquids from the logging fluids of the present invention (frequently called "filter loss") outwardly into formations into which wells were drilled and to be logged, fluid loss-preventing agents are preferably added to the logging fluids of the present invention. These loss-preventing agents are also used in drilling fluids in which they typically act by coating the walls of the borehole as the well is being drilled. The fluid loss control agents include, but are not limited to, modified lignites, polymers, asphaltic compounds and the like. Preferably, the fluid loss additives are non-toxic for environmental and safety considerations. An example of such non-toxic fluid loss agents is humate which is the product of reacting humic acid with amides of polyalkylene polyamines Certain of the humates have improved high-temperature performance of drilling fluids, as described in U.S. Pat. No. 3,775,447 (to Andrews, et al.). A commercially available high-temperature humate composition useful in the present invention is marketed by the Baroid Drilling Fluids, Inc., as DURATONE HT (described as the reaction product of lignite and a quaternary ammonium salt). Another commercially available fluid loss control agent is available from Dowell Schlumberger as TRUDRILL S Fluid Loss Additive C218. If further fluid loss control is desired, other additives such as organopadic lignites, blown asphalt, uintaite or other polymeric materials that will line the borehole can be used. Fluid loss agents can be used in amounts of up to about 7 kilograms per cubit meter of logging fluid.

Preparation of Logging Fluid

The logging fluids of the present invention can be prepared in a manner analogous to those normally used to prepare oil-based drilling fluids. In one representative procedure for producing an invert emulsion logging fluid, the desired quantity of non-conductive liquid and an emulsifier are mixed together, then the remaining components are added sequentially with continuous mixing.

Using an aqueous phase of an emulsifying agent, the non-conductive liquid can be used to form water-in-oil emulsions suitable for use in logging fluids of the present invention. As earlier noted, the aqueous phase can be fresh water, or can be water having dissolved salts in any desired amount. Such dissolved salts are, for example, used to increase fluid density, decrease the swelling effects of aqueous matter on formation clays, and reduce hole enlargement caused by the dissolution of formation components which are water soluble. Suitable salts for dissolving in the aqueous phase include, without limitation, sodium chloride, potassium chloride, calcium chloride, and mixture thereof. Such salts have been referred to herein as secondary salt additives,. However, primary salt additives may also be used for this purpose.

An invert emulsion is formed by vigorously mixing together the non-conductive liquid, the aqueous phase and the emulsifying agent in desired proportions. The emulsifying agent may be a "primary emulsifier", either used alone or in combination with a "secondary emulsifier". Various primary emulsifiers are known in the art as useful for oil-base fluids which use crude oil or its fractions as a base. These primary emulsifiers include fatty acid mixtures, which function after their conversion to soaps, and therefore require the presence of sufficient alkaline earth metal ions to form the soaps) and modified sodium salts of higher organic acids. Other materials, such as triglycerides and sulfonates, can also be used as primary emulsifiers in the logging fluids of the present invention, preferably the emulsifiers are non-toxic or are used in non-toxic amounts.

Secondary emulsifiers, which assist in maintaining phase stability at high temperatures and in the presence of brines, include materials such as polyamides. Suitable polyamide emulsifiers include those produced by reacting a polyalkylene polyamide with a fatty acid, using greater thana stoichiometric amount of the amine, then reacting all remaining amine material with such dicarboxylic acids as maleic acid and fumaric acid.

In summary, successful application of this invention, as is appreciated by one skilled in the art, requires the following knowledge:

1. Knowledge of the characteristics of the logging tool to be used is most important. An electric logging device that applies a higher voltage to the drilling fluid and/or formation will, in general, more successfully work in a medium which could be called a partial dielectrical material. A logging tool able to respond to reduced voltage difference or lower current flow will require reduced drilling fluid treatment to successfully record changes in the electrical characteristics of the formation.

2. A dielectric measurement and evaluation of the medium (logging fluid) in which the logging tool is used. This can be the "electrical stability" as measured with an industry standard test meter, or it can be a special device that models the behavior of the logging tool itself.

3. Knowledge of the logging fluid chemistry, ratio of aqueous to non-aqueous phases, and environmental impacts and criterion is valuable to successful application of this invention. A fluid modified to provide the electrical characteristics necessary for successful well logging must also be able to provide the hydrostatic pressure, suspension characteristics, similar osmotic balance, and protection to sensitive formations.

Together with the present disclosure and the foregoing knowledge, one skilled in the art will be able to determine if the drilling fluid being used may be sufficiently modified or that a logging fluid be generated which satisfies the field requirements to perform a successful logging of the wellbore. The logging fluid may be circulated throughout the entire wellbore, but it is preferred that the logging fluid be spotted in the area of the wellbore to be electrically logged. The spotting of a fluid is well known to those skilled in the art. In this manner, only a minimal amount of fluid needs to be modified and can be readily mixed with the remaining drilling fluid to avoid special handling. If special handling is required, the spotting of the logging fluid will limit the amount of such special handling.

Knowledge of tool characteristics and base line drilling fluid characteristics will allow the user of this invention to modify the dielectric characteristics of the drilling fluid to produce the logging fluid and thereby provide an optimum environment for operation of the logging tool. It may be necessary to add water or brine to the drilling fluid to dilute emulsifier concentration and reduce the baseline dielectric characteristics of the fluid. After this pretreatment is performed, a secondary treatment with this invention to add the primary salt additive(s) may be necessary to further reduce the dielectric characteristics to a level where the logging tool can measure voltage or current differences.

The logging fluid of the present invention may be utilized with any conventional electrical logging tool such that the characteristics thereof are compatible with the extent of modification allowable by the present invention of the logging fluid. Again, this relates to knowing the characteristics of the logging tool and of the drilling fluid or logging fluid to be generated. Logging tools which utilize a pad of electrodes in which the outputting electrode and receiving electrode are both on the same pad which contact the mudcake and/or wellbore formation surface are well suited for use in the present invention. Examples of such techniques and devices for focused electrical investigations are described and shown in U.S. Pat. Nos. 2,712,629 to Doll; 2,750,557 to Bricuad; and 4,468,623 to Gianzero, et al., which are hereby incorporated by reference. Other electrical logging devices such as those disclosed in U.S. Pat. Nos. 3,521,154 to Maricelli and 4,468,623 to Gianzero, et al., disclosed a pad with electrodes which send out a current into the formation while the pad is in contact with the mudcake or the formation. The return or closing of the current loop is located on the tool device, for example, the support member 18 above the insulating sleeve 29 as shown in FIG. 1 in the Maricelli patent. An insulator sleeve 29 is positioned between the electrode/pad assembly 19–22 and the current loop closure portion of the tool. Such is the same as on the Gianzero device. In this situation, the closure of the current loop requires that the current cross from the formation face in the borehole to the tool return point, e.g. support member 18 mentioned above with respect to Maricelli, which needs to cross a body of the logging or drilling fluid in order to achieve current loop closure. In this situation, the solid particle density in the drilling and/or logging fluid must be sufficiently low to allow sufficient fluid to allow current loop closure to occur. Accordingly, the solid particle density of the drilling and/or logging fluid is preferably less than 16 lbs/gal. U.S. Pat. Nos. 3,521,154 and 4,468,623 are hereby incorporated by reference in their entirety.

In U.S. Pat. No. 4,468,623, an earth formation investigating tool is described with which borehole wall features of the order of millimeters in size can be detected. The tool includes an array of small cross-section survey electrodes (buttons) which are pressed towards the borehole wall and each button injects an electric current into the adjoining formation. The buttons and the tool support member form a substantially closed loop similar to Maricelli. The individual button currents are monitored and signals representative of button currents are recorded as curves as a function of depth. The measured button currents reflect the resistivity of the material in front of each button. In order to achieve a high resolution investigation, the electrodes are arranged in an array of multiple rows. The electrodes are so placed at intervals along a circumferential direction about the borehole axis so as to inject survey currents into borehole walls segments which overlap with each other to a predetermined extent as the tool is moved along the borehole wall. In this manner, a detailed high resolution resistivity or conductivity investigation of the borehole wall can be made. This can be particularly effective for deriving orientations of surface anomalies such as fractures or stratigraphy in the borehole wall opposite to the pad on which the electrodes are mounted. These surface anomalies, when invaded by the mud of the borehole, normally present a contrasting conductivity relative to the adjoining borehole wall. By monitoring measure electrodes in selected pairs along the loop, resistivity anomalies and their alignments can be determined with enhanced contrast relative to more homogeneous portions of the borehole wall.

With a technique in accordance with U.S. Pat. No. 4,567,759 modified to use the logging fluid of the present invention, a high resolution investigation of a borehole wall can be made in a practical and visually acceptable manner that is particularly suitable for a high resolution tool such as described in the aforementioned Gianzero et al. patent. With such technique, a plurality of high spatial resolution signals are generated which are respectively representative of a borehole wall characteristic; for example, its conductivity, at discrete locations. The signals in the aggregate represent such characteristic over a vertically and circumferentially continuous segment of the borehole wall.

The signals are then modified by removing effects such as tool velocity variations, and perturbations attributable to variations in the borehole environment and signal amplifiers in the tool. This modification enables subsequent signal enhancements with which the signals can be displayed in a manner that approaches the character of a visual image from inside the borehole of the borehole wall characteristic. Since the human eye is highly perceptive, fine high resolution features of the characteristics can be visually discerned and interpreted.

The term high resolution as employed herein refers to the ability to spatially resolve fine features of the measured characteristic from a visual image of such characteristic. Such fine features include minute variations of the characteristic in the circumferential as well as vertical directions along the borehole wall. For example, in a conductivity image obtained in accordance with the invention, high resolution features can be observed such as vugs, small stratigraphy beds and their circumferential thickness variations, small scale lithology changes, pore sizes, fractures and their density and height, and their vertical and lateral continuity. Finer details may be observed. With a borehole wall image formed in accordance with the invention features of the characteristic of the borehole wall are revealed whose circumferential dimensions are at least smaller than about four percent of the circumference of the borehole wall. When a technique of this invention is employed to acoustically investigate a borehole wall formed by the casing and the cement bond behind the casing, the term high resolution refers to the ability to spatially resolve features such as small thickness variations of the casing and circumferentially narrow vertically oriented separations between the casing and the cement. Generally high resolution features of the order of several millimeters in magnitude can be observed from a visual image formed in accordance with the invention.

A principal aspect of this invention is the investigation of a borehole wall characteristic whose spatial variations are small yet can be measured and displayed in a visual image. The term characteristic as referred to herein, therefore, primarily relates to small scale events such as vugs, small stratigraphy beds, pores, small fractures and other fine detailed features. These events may have a thickness as small as several millimeters.

As part of a technique in accordance with the invention, the characteristic signals, which are originally measured at regular time intervals, are accurately converted to signals representative of the borehole wall characteristic as a linear function of borehole depth. The conversion involves a measurement of the borehole depth to which the characteristic signals relate with a precision that is of the same order as the high spatial resolution of the signals.

This technique is particularly useful in a microconductivity investigation of the earth formation with tools as described in the aforementioned Gianzero et al. patent. Such tool employs an array of small diameter survey electrodes arranged in multiple horizontal rows on a pad that is pressed towards the borehole wall. The electrodes are laterally spaced from each other in a particular manner so as to circumferentially overlap when projected along a common depth line. Currents injected by the electrodes are sampled as indicative of the conductivity of the borehole wall opposite the electrodes. After processing of the samples such as their conversion to samples of conductivity as a linear function of depth, the samples from all the rows of electrodes in the array are depth shifted to a common depth. This produces a high density of circumferential samples with which a high resolution conductivity image may be produced by recording amplitudes of the samples as variable image intensities.

Factors such as mudcake or a lift-off condition of the tool may cause visually apparent artifacts in the image logs. Similar artifacts may be caused by variations in the gains or off-sets of electronic signal processing devices used to process the electrode current measurements. These artifacts appear as longitudinal alternating dark and light bands. In accordance with one technique of the invention, such artifacts are removed by an equalization process of the signals representative of the conductivity of the borehole wall. Equalizing of the variations may be obtained by determining deviations of the signals at common depth intervals from an average of such signals as measured over regions which effectively surround the common depth intervals. The signals at the common depth intervals are then altered in accordance with the determined deviations.

A particular effective technique of the invention involves a compression of characteristic signals with a variable scale factor in such manner that a visual image display of significant features of the earth formation can be made over the full dynamic range of the characteristic represented by the signals. This is obtained by evaluating the amplitudes of the signals over a range of depth intervals and applying the evaluation as a scale factor to control the intensity of the image at the center of the range of intervals. As a result, extreme values of the characteristic can be properly imaged through the absolute scale value of the image log is varied. The variable scale factor can be recorded alongside the image log to provide an indication of absolute values. This image compression technique is particularly effective where conductivity of the earth formation is imaged. Conductivity typically has a dynamic range of the order of $10^4$ so that use of the variable scale factor enables use of an image log color scale, e.g., grey scale, with which small scale variations in both low and high conductivity formations can be observed. The conductivity samples are processed for display using a known pixel technique wherein pixels are defined with variable intensity levels so as to form an image log, wherein the grey level is a function of the conductivity with darker regions being representative of, for example, higher conductivity. The intensity variations are visually recorded on a recording medium, for example, a cathode ray oscilloscope, or a hardy copy medium. Devices and techniques for making such visual records are known in the art.

EXAMPLES

EXAMPLE 1: Use of Magnesium Chloride

In this example, a laboratory scale test was performed on samples of relatively non-conductive drilling fluids. These fluids were modified by the addition of various concentrations of a salt, specifically magnesium chloride, to modify the dielectric characteristics of the fluid as shown by changes in the electrical stability of the drilling fluid. While the electrical characteristics of the measurement tool, an industry standard "Electrical Stability" meter, do not closely match the characteristics of every electric logging tool, subsequent field tests of similar fluids modified according to the present invention in a well with the actual logging tool provided good measure of the superficial resistive characteristics of the well borehole. Therefore, the Electrical Stability meter test provides a good indication of suitable salts and concentrations thereof in a non-conductive fluid being considered for use with an electric well logging tool.

The test meter used in this Example was a Fann Instruments 23D meter available from the Fann Instruments Company. This meter is the industry standard "ES" meter. It can apply 2000 volts potential across an electrode pari submerged in a sample of the drilling fluid. Device specifications (from API RB 13B-2) are as follows:

| | |
|---|---|
| Voltage range | 0 to 2000 volts AC |
| Voltage ramp | 150 volts/second (14 seconds to reach 2048 volts) |
| Frequency | 350 Hz sine wave |
| Trip current | 61 microamps |
| Probe pair dimension | |
| face diameter | 0.125 inch |
| gap | 0.061 inch |

The non-conductive fluids used in this Example were invert emulsions having oil to water volume ratios of 70/30 and 50/50. The "oil", i.e., non-aqueous fluid, in these invert emulsions were DURASYN 162 polyalphaolefin (an olefin-type fluid available from Amoco Chemical Company), PETROFREE (an ester derivative of vegetable oil, available from Baroid Drilling Fluids, Inc.), and diesel fuel #2. The conventional additives in the fluid were calcium chloride, an emulsifier (EZ MUL NTE, available from Baroid Drilling Fluids, Inc.), a fluid loss control material (DURATONE HT, reaction product of lignite and quaternary ammonium salt, available from Baroid Drilling Fluids, Inc.), calcium hydroxide, an organophylic clay gellant (BENTONE 38, available from Baroid Drilling Fluids, Inc.), a barite (API grade) in the quantities shown in Table 1. The electrical stability values ("ES") in volts for the fluid, the mudcake and each of the modified fluids are also given in Table 1.

EXAMPLE 2: Other Salts and Salt Combinations

In this example, other salts were tested in an 80/20 (volume ratio) oil to water invert emulsion drilling fluid already containing 250 K ppm $CaCl_2$ as an osmotic additive. Table 2 contains the results of this Example and provides a comparative performance of different salts in one specific environment. Table 2 may be used as a formulation guide and is pertinent to any of the invert emulsion, such as those containing the non-aqueous fluids used in Example 1.

In this example, the base fluid formulation was an invert emulsion having 270 ml of DURASYN 162 polyalphaolefin (an olefin-type fluid available from Amoco Chemical Company) as the non-aqueous fluid and 67 ml of water. The base fluid contained the following additives (which are as described in Example 1):

| | |
|---|---|
| $CaCl_2$ | 24 grams |
| emulsifier | 4 grams |
| calcium hydroxide | 3 grams |
| fluid loss control material | 4 grams |
| organophylic clay gellant | 4 grams. |

The addition of salt was sequential and cumulative with 2 minutes of low speed mixing after each salt addition. The salts were added in a hydrated form as applicable. For example, a 20 gram (g) addition of magnesium chloride as shown in Table 2 actually represents 20 g of $MgCl_2 \cdot 6H_2O$. The actual addition of anhydrous magnesium chloride salt is therefore approximately $(94/203) \times 20 \text{ g} = 9.26 \text{ g}$

TABLE 2

ELECTRICAL STABILITY VALUES (VOLTS)

| SALT ADDED | AMOUNT OF SALT ADDED (16/BARREL) | | | | | | |
|---|---|---|---|---|---|---|---|
| | 0 | 10 | 20 | 35 | 40 | 60 | 90 |
| NaCl | 518 | 494 | | 437 | | 340 | 277 |
| $CaCl_2$ | 518 | 547 | | 581 | | | |

TABLE 1

| | 70/30 | 70/30 | 70/30 | 50/50 | 50/50 | 50/50 | 50/50 | 50/50 | 50/50 |
|---|---|---|---|---|---|---|---|---|---|
| oil/water base "oil" | olefin | ester | diesel | olefin | ester | diesel | olefin | ester | diesel |
| olefin, ml | 229.3 | | | 164 | | | 164 | | |
| ester, ml | | 229.3 | | | 164 | | | 164 | |
| diesel, ml | | | 229.3 | | | 164 | | | 164 |
| water, ml | 96.1 | 96.1 | 96.1 | 159.4 | 159.4 | 159.4 | 159.4 | 159.4 | 159.4 |
| $CaCl_2$, g | 44 | 44 | 44 | 74 | 74 | 74 | 74 | 74 | 74 |
| emulsifier, g | 4 | 4 | 4 | 4 | 4 | 4 | 2.75 | 2.75 | 2.7 |
| fluid loss control material, g | 4 | 4 | 4 | 4 | 4 | 4 | 2.75 | 2.75 | 2.75 |
| calcium hydroxide, g | 4 | 0 | 4 | 4 | 0 | 4 | 2.75 | 0 | 2.75 |
| organophylic clay gellant, g | 4 | 1 | 2 | 2 | 0 | 2 | 2.75 | 2.75 | 2.75 |
| barite, g | 48 | 48 | 48 | 5 | 5 | 5 | 33 | 33 | 33 |
| mixed at high speed, min | 10 | 10 | 10 | 10 | 10 | 10 | 10 | 10 | 10 |
| ES - drilling fluid, V | 365 | 270 | 320 | 307 | 199 | 322 | 116 | 134 | 140 |
| ES - mud cake, V | 326 | 390 | 428 | 229 | 226 | 351 | 100 | 56 | 90 |
| Fluid ES measurements | | | | | | | | | |
| with 8 g Mg $Cl_2$, V | 253 | 232 | 264 | 215 | 94 | 183 | 42 | 25 | 78 |
| with 16 g Mg $Cl_2$, V | 140 | 102 | 137 | 131 | 74 | 115 | 38 | 21 | 72 |
| with 32 g Mg $Cl_2$, V | 121 | 46 | 63 | 88 | 46 | 92 | 28 | 17 | 58 |
| Mud Cake ES measurements | | | | | | | | | |
| with 8 g Mg $Cl_2$, V | 78 | 65 | 46 | 51 | 44 | 67 | 51 | 44 | 24 |
| with 16 g Mg $Cl_2$, V | 23 | 24 | 36 | 23 | 19 | 45 | 23 | 19 | 22 |
| with 32 g Mg $Cl_2$, V | 17 | 16 | 29 | 14 | 11 | 42 | 14 | 11 | 16 |

TABLE 2-continued

ELECTRICAL STABILITY VALUES (VOLTS)

| SALT ADDED | AMOUNT OF SALT ADDED (16/BARREL) | | | | | |
|---|---|---|---|---|---|---|
| | 0 | 10 | 20 | 35 | 40 | 60 | 90 |
| $MgCl_2$* | 518 | 439 | | 262 | | 119 | |
| $MgSO_4$ | 532 | | 481 | | 432 | 387 | |
| $MgNO_4$ | 510 | | 299 | | 241 | 129 | |
| $ZnCl_2$ | 532 | | 347 | | 253 | 135 | |
| $AlCl_3$ | 532 | | 364 | | 276 | 98 | |
| $FeCl_3$ | 510 | 415 | 310 | | 101 | | |
| $SnCl_4$ | 510 | | 498 | | 441 | | |
| NaOC(O)H | 488 | | 405 | | 328 | | |

*$MgCl_2$ is in hydrated form-$MgCl_2.6H_2O$.

The data in Table 2 indicates that soluble salts generally reduce the electrical stability of invert emulsion muds and that hygroscopic and highly soluble salts with polyvalent cations generally perform better than salts containing monovalent cations. With some invert emulsion muds, salt mixtures may provide more reduction in electrical stability. Performance of sodium and potassium salts cannot be used to predict performance of polyvalent cations associated with the same anion. For example, it is expected that magnesium formate $Mg(OC(O)H)_2$ would perform similarly to magnesium chloride.

The data in Table 2 also indicates that even among polyvalent cations not all behave similarly. For example, tin in $SnCl_4$ does not perform as well as magnesium, zinc, aluminum and iron. Therefore, divalent and trivalent cations are preferred. However, calcium chloride does not perform as well as magnesium chloride and zinc chloride. Further, not all anions behave similarly. For example, the chloride and nitrate of magnesium out perform the sulfate of magnesium. Therefore, the halide and nitrate anions are preferred. The cation is a metal, preferably a divalent or trivalent metal, capable of forming a chelate or complex, for example, magnesium, zinc, cobalt, nickel, copper, aluminum and iron.

TABLE 3

ELECTRICAL STABILITY VALUES (VOLTS)

| FORMU-LATIONS | SALT COMBINATION | | | | ELECTRICAL STABILITY (VOLTS) |
|---|---|---|---|---|---|
| | SALT 1 | AMOUNT (lb/BBl) | SALT 2 | AMOUNT (lb/BBL) | |
| A[1] | $MgCl_2$ | 60 | $NaCl_{11}$ | 30 | 141 |
| B[2] | $MgCl_2$ | 10 | $AlCl_3$ | 10 | 445 |
| C[2] | $MgCl_2$ | 20 | $AlCl_3$ | 20 | 274 |
| D[2] | $MgCl_2$ | 30 | $AlCl_3$ | 30 | 117 |
| E[3] | $MgCl_2$ | 20 | $FeCl_2$ | 20 | 208 |
| F[3] | $MgCl_2$ | 30 | $FeCl_3$ | 30 | 90 |

[1]Base electrical stability (i.e., no additional salts) is 518 V.
[2]Base electrical stability is 532 V.
[3]Base electrical stability is 510 V.

EXAMPLE 3: Field Test

There are many types of logging devices to which this invention is applicable. Some actually touch the rock formation being drilled and other electric logging devices do not touch the formation. In this example for demonstration purposes, a tool was tested using this invention which measures differential surface resistivity by means of an array of several hundred button-like sensors which are pulled up to the well borehole at a controlled rate. This tool is according to U.S. Pat. No. 4,468,623 to Gianzero, more specifically an embodiment which is generally similar to that shown in FIGS. 2 and 5 thereof, wherein such U.S. Pat. is hereby incorporated by reference. While traveling up the well borehole and in intimate contact with the rock formation, each button sensor conducted a flow of electrons onto and into the near surface of the rock formation. The variation in voltage (other devices may monitor current) at each individual sensor was recorded by computer and an image produced from the outputs of the multitude of individual sensors. The image was produced according to U.S. Pat. No. 4,567,759 to Ekstrom et al., which is hereby incorporated by reference.

The general characteristics of the logging tool used in field tests are as follows:

| | |
|---|---|
| Maximum voltage | 900 volts AC |
| Frequency | 15 KHz sine wave |
| Ramp | not applicable - voltage modified to maintain constant current |
| Current sensitivity | <25 microamps |
| face diameter | approx 3 mm |
| gap | up to 30 cm |

This particular tool was suspended in the well borehole by an insulated and conducting cable from the surface. The downhole sensor array was electrically connected to a recording device and computer at the surface that produced the images shown in FIGS. 1A through 1E. There are many variations of this electric logging tool. Some do not require a direct connection to surface. Further, rather than a direct electrical connection for transmitting the data to the surface, the signal or data can be transmitted via pump pulsation or sonic transduction through the drilling fluid itself or electromagnetically.

EXAMPLE 4: Field Tests

In this example, a field test was conducted in Hollywood Quarry which is located in Clark County, Ark. The quarry was chosen as: (1) it exposes an approximately 140-ft (43-m) thick turbidite succession (Jackfork Sandstone) consisting of the most commonly encountered turbidite succession reservoir facies: interbedded sandstone-shale and massive sandstone; and (2) bedding attitude is relatively low (~12° dip) which is in the range for acquisition of high quality image data.

As a control, continuous coring was conducted in borehole HQ #1 so that the images produced by the well logging could be compared directly to lithologies encountered in the borehole. Coring was terminated at about 219.5 ft (67 m). Turbidite facies recovered included interbedded sandstone-shale in the upper and lower parts of the core; the dominant facies was amalgamated, massive, high-concentration turbidities.

Abundant fracturing was observed locally in the cored interval. Fractures above 60 ft (18 m) appeared to be related to blasting in the quarry, but those below the quarry floor (particularly from 110–145 ft, 34–44 m) were tectonic (i.e., orogenic) in origin. This was significant as the borehole was both making and losing water through coring, from a non-aquifer rock formation, which could possibly result in loss of the synthetic fluids into the formation during logging.

Coring results presented two problems which had to be resolved before the field test could proceed: (1) massive sandstone was not the appropriate facies for testing imaging acquisition in synthetic-based muds (SBM), and (2) the possibility of fluid loss meant that casing would have to set over the fractured zones which precluded logging the upper interbedded facies. Subsequently, HQ #1 was reamed and drilled, with water-based fluid, to about 480 ft (146 m) and Formation MicroImager (FMI) images were acquired. The images showed a suitable succession of bedding types below the massive sandstone to adequately test image collection in SBM at the Hollywood Quarry.

A total of three boreholes were air drilled and filled with water to saturate the formation prior to logging operations (Table 4). As shown in Table 4, olefin and ester fluids were used during the outcrop test. Diesel was omitted from the test because of the possibility of fouling local aquifers due to the water flow encountered during coring operations.

TABLE 4

General information for three boreholes tested at Hollywood Quarry.

| HOLE | FLUID | LOCATION | DEPTH | CASING | LCM** |
|------|-------|----------|-------|--------|-------|
| HQ#1* | Ester (PetroFree) | 50 ft (15 m) west of quarry wall | 480 ft (146 m) | 159 ft (48 m) | Yes; in SBM |
| HQ#2 | Water | 25 ft (7.5 m) south of HQ-1 | 100 ft (30 m) | 6 ft (2 in) | No |
| HQ#3 | Olefin (UltiDrill) | 25 ft (7.5 m) west of HQ-1 | 480 ft (146 m) | 154 ft (47 m) | Yes in WBM |

*cored hole
**LCM used was shredded cedar

A total of 11 log runs were made in the three boreholes using a Formation MicroImager (FMI).

TABLE 5

Well log data acquisition per well.

| WELL ID | FMI |
|---------|-----|
| HQ#1 Water | X |
| HQ#1 60/40 Ester | X |
| HQ#1 60/40 Ester + MgCl$_2$ | X |
| HQ#1 70/30 Ester + MgCl$_2$ | X |
| HQ#1 80/20 Ester + MgCl$_2$ | X |
| HQ#2 Water | X |
| HQ#3 Water | X |
| HQ#3 60/40 Olefin | X |
| HQ#3 60/40 Olefin + MgCl$_2$ | X |
| HQ#3 70/30 Olefin + MgCl$_2$ | X |
| HQ#3 80/20 Olefin + MgCl$_2$ | X |

The log runs assessed the stratigraphic characteristics of the rock formation.

The logging program design was to acquire a base-condition log in a water-based mud (control) each borehole (except HQ #2), mud-up with a 60/40 SBM, run the geological package log suite, and continue increasing oil concentration by 10% (i.e., 70/30 SBM, 80/20 SBM, etc.). Followed by a log run until image quality degraded beyond useable limits. At that point, the magnesium chloride (MgCl$_2$) was be added to the SBM and the oil concentration would again be increased in steps until the lower limit of good data quality was reached.

In actuality, poor quality images were acquired in the 60/40 SBM in both the olefin and ester drilling fluids (see Table 6). Therefore, magnesium chloride was added to the fluid system immediately and data acquisition proceeded up through the 80/20+MgCl$_2$ case.

TABLE 6

Subjective ranking of FMI images at Hollywood Quarry. Ranking based on evaluation of paper prints of the raw field data.

| DRILLING FLUID | WBM | 60/40 SBM | 60/40 SBM + MgCl$_2$ | 70/30 SBM + MgCl$_2$ | 80/20 SBM + MgCl$_2$ |
|---|---|---|---|---|---|
| Olefin | 10 | 3 | 8 | 8 | 7.5 |
| Ester | 10 | 1 | 7 | 6 | 5 |

(10 = excellent data; 1 = poor, useless data)

As seen in Table 6, good to moderate quality images where collected in all fluid concentrations with the magnesium chloride additive. The reduced quality acquired in the ester-based fluid (HQ #3) may be related to the fact that: (1) the electrical stability (ES) values were greater in the ester than in the olefin (Table 7); or (2) the addition of the fluid loss control additive into the ester SBM (rather than WBM as in HQ #1) contaminated the borehole environment. The fluid loss control additive contained pieces of plastic up to a couple centimeters that could have been caked against the wall or were free floating.

TABLE 7

Electrical stability of drilling fluids in wells HQ #1 (ester) and HQ #3 (olefin).*

| OIL/WATER CONC. | OLEFIN | ESTER |
|---|---|---|
| 60/40 | 240 | 268 |
| 60/40 + MgCl$_2$ | 68 | 224 |
| 70/30 + MgCl$_2$ | 84 | 168 |
| 80/20 + MgCl$_2$ | 75 | 128 |

*Values measured at drill site.

It is noted that the ES of these fluids without modification are about 250 volts or less. These fluids would be suitable without modification, but the lower the ES the less power is required to perform the survey. Further, the more polar ester fluid is easier to emulsify, but more difficult to reduce the electrical stability of the fluid.

Significant results of the field testing include:
(1) Good borehole images can be acquired in SBM's.
(2) Magnesium chloride additive positively alters the chemistry and electrical stability of the drilling fluids promoting data acquisition.

(3) SBM's without additive to enhance electrical stability seriously degrades FMI data.

What is claimed:

1. A well logging fluid comprising:

a non-conductive fluid, wherein the non-conductive fluid is selected from the group consisting of a non-aqueous fluid and an invert emulsion of an aqueous phase in a non-conductive liquid; and an effective amount of a salt sufficient to modify the electrical characteristics of the non-conductive fluid resulting in the well logging fluid with an electrical stability of at most 350 volts as measured according to API RB 13-2 in which an electrical well-logging tool when disposed in the well logging fluid can perform an electrical well-logging survey of a borehole containing the well logging fluid, wherein the salt has a cation and an anion, the cation is selected from the group consisting of divalent and trivalent metal cations capable of forming a complex, and the anion is one that disassociates from the cation in an aqueous medium.

2. The well logging fluid of claim 1, wherein the non-conductive fluid is an invert emulsion of an aqueous phase in a non-conductive liquid.

3. The well logging fluid of claim 2, wherein the aqueous phase ranges up to about 70 percent by volume of the invert emulsion.

4. The well logging fluid of claim 3, wherein the aqueous phase ranges from about 10 to about 40 percent by volume of the invert emulsion.

5. The well logging fluid of claim 1, wherein the well logging fluid has an electrical stability of at most 250 volts as measured according to API RB 13-2.

6. The well logging fluid of claim 1, wherein the metal for the cation is selected from the group consisting of magnesium, zinc, cobalt, copper, aluminum and iron.

7. The well logging fluid of claim 1, wherein the metal is selected from the group consisting of magnesium, zinc and aluminum.

8. The well logging fluid of claim 1, wherein the anion is selected from the group consisting of halides, nitrates, formates, citrates and acetates.

9. The well logging fluid of claim 1, wherein the anion is selected from the group consisting of halides and nitrates.

10. The well logging fluid of claim 1, wherein the salt is magnesium chloride hexahydrate.

11. A well logging fluid comprising:

a non-conductive fluid, wherein the non-conductive fluid is selected from the group consisting of a non-aqueous fluid and an invert emulsion of an aqueous phase in a non-conductive liquid; and an effective amount of a non-radioactive salt sufficient to modify the electrical characteristics of the non-conductive fluid resulting in the well logging fluid with an electrical stability of at most 350 volts as measured according to API RB 13-2 in which an electrical well-logging tool when disposed in the well logging fluid can perform an electrical well-logging survey of a borehole containing the well logging fluid, wherein the non-radioactive salt has a cation and an anion, the cation is selected from the group consisting of tin, cobalt, zinc, nickel, copper, aluminum, and iron, and the anion is selected from halides, nitrates, formates, citrates and acetates.

12. The well logging fluid of claim 11 wherein the non-radioactive salt is zinc chloride, aluminum chloride, or iron chloride.

13. The well logging fluid of claim 11, wherein the non-conductive fluid is an invert emulsion of an aqueous phase in a non-conductive liquid and the aqueous phase ranges from about 10 to about 70 percent by volume of the invert emulsion.

14. The well logging fluid of claim 11, wherein the aqueous phase ranges from about 10 to about 40 percent by volume of the invert emulsion.

15. A well logging fluid comprising:

a non-conductive fluid, wherein the non-conductive fluid is a 100% non-aqueous fluid;

and an effective amount of a non-radioactive salt sufficient to modify the electrical characteristics of the non-conductive fluid resulting in the well logging fluid with an electrical stability of at most 350 volts as measured according to API RB 13-2 in which an electrical well-logging tool when disposed in the well logging fluid can perform an electrical well-logging survey of a borehole containing the well logging fluid, wherein the non-radioactive salt has a cation and an anion, the cation is selected from the group consisting of divalent and trivalent metal cations capable of forming a complex, and the anion is one that disassociates from the cation in an aqueous medium.

* * * * *